(12) United States Patent
Elgersma et al.

(10) Patent No.: US 10,607,364 B2
(45) Date of Patent: Mar. 31, 2020

(54) POSITION AND ATTITUDE DETERMINATION METHOD AND SYSTEM USING EDGE IMAGES

(71) Applicant: Honeywell International Inc., Morris Plains, NJ (US)

(72) Inventors: Michael Ray Elgersma, Plymouth, MN (US); Benjamin Mohr, St. Louis Park, MN (US)

(73) Assignee: Honeywell International Inc., Morris Plains, NJ (US)

(*) Notice: Subject to any disclaimer, the term of this patent is extended or adjusted under 35 U.S.C. 154(b) by 324 days.

(21) Appl. No.: 15/799,444

(22) Filed: Oct. 31, 2017

(65) Prior Publication Data

US 2019/0130595 A1    May 2, 2019

(51) Int. Cl.
*G06T 7/70* (2017.01)
*G01B 11/00* (2006.01)
*G01C 11/10* (2006.01)
*G01C 21/28* (2006.01)
*G05D 1/10* (2006.01)
*G06K 9/62* (2006.01)
*G05D 1/08* (2006.01)
(Continued)

(52) U.S. Cl.
CPC .............. *G06T 7/70* (2017.01); *G01B 11/002* (2013.01); *G01C 11/10* (2013.01); *G01C 21/28* (2013.01); *G05D 1/08* (2013.01); *G05D 1/10* (2013.01); *G06K 9/6202* (2013.01); *G06T 7/579* (2017.01); *G06T 7/593* (2017.01); *G06T 7/75* (2017.01); G06T 2207/10028 (2013.01); G06T 2207/20056 (2013.01)

(58) Field of Classification Search
CPC ......... G06T 7/70; G06T 7/593; G01B 11/002; G01C 21/28; G06K 9/6202
USPC ............................................. 701/28; 345/424
See application file for complete search history.

(56) References Cited

U.S. PATENT DOCUMENTS 8,569,669 B2   10/2013  Holicki et al.
2002/0164067 A1   11/2002  Askey et al.
(Continued)

OTHER PUBLICATIONS

Nguyen et al., "Tracking Objects in an Indoor Environment Using 3D Models", "12th International Multi-Media Modelling Conference Proceedings, 2006", 2006, pp. 434-437, Publisher: IEEE.
(Continued)

*Primary Examiner* — Isaac G Smith
(74) *Attorney, Agent, or Firm* — Fogg & Powers LLC

(57) ABSTRACT

A method of determining at least one of position and attitude in relation to an object is provided. The method includes capturing at least two images of the object with at least one camera. Each image is captured at a different position in relation to the object. The images are converted to edge images. The edge images of the object are converted into three-dimensional edge images of the object using positions of where the at least two images were captured. Overlap edge pixels in the at least two three-dimensional edge images are located to identify overlap points. A three dimensional edge candidate point image of the identified overlapped points in an evidence grid is built. The three dimensional candidate edge image in the evidence grid is compared with a model of the object to determine at least one of a then current position and attitude in relation to the object.

20 Claims, 5 Drawing Sheets

(51) Int. Cl.
  *G06T 7/593* (2017.01)
  *G06T 7/73* (2017.01)
  *G06T 7/579* (2017.01)

(56) References Cited

U.S. PATENT DOCUMENTS

2015/0332100 A1    11/2015  Yamaguchi
2017/0098309 A1*   4/2017   Michel .................. B25J 9/1692

OTHER PUBLICATIONS

Chen et al., "Standard Deviation Normalized Summed Squared Difference for Image Registration", 2017 International Conference on Digital Image Computing: Techniques and Applications (DICTA), Dec. 2017, pp. 18, IEEE.

European Patent Office, "Extended European Search Report from EP Application No. 18203230.0 dated Jun. 13, 2019", from Foreign Counterpart to U.S. Appl. No. 15/799,444, pp. 110, Published: EP.

Irschara et al., "Efficient Structure from Motion with Weak Position and Orientation Priors", Computer Vision and Pattern Recognition Workshops (CVPRW), Jul. 2011, pp. 18, IEEE.

Lhuillier, "Incremental Fusion of Structure-from-Motion and GPS Using Constrained Bundle Adjustments", IEEE Transactions on Pattern Analysis and Machine Intelligence, Dec. 2012, pp. 2489-2495, vol. 34, No. 12, IEEE.

Martin et al., "Robot Evidence Grids", CMU-RI-TR-96-06, The Robotics Institute, Mar. 1996, pp. 1-49, Carnegie Mellon University.

Moravec, "Robot Spatial Perception by Stereoscopic Vision and 3D Evidence Grids", CMU-RI-TR-96-34, The Robotics Institute, Sep. 1996, pp. 1-44, Carnegie Mellon University.

Santoso et al., "3D Mapping for Visualization of Rigid Structures: A Review and Comparative Study", IEEE Sensors Journal, Mar. 15, 2016, pp. 1484-1507, vol. 16, No. 6, IEEE.

* cited by examiner

POSITION AND ATTITUDE DETERMINATION METHOD AND SYSTEM USING EDGE IMAGES

BACKGROUND

Navigation based on computer added systems have many applications. Near a destination, some vehicles using such a system may need to know its precise three-dimensional position and orientation with respect to the destination. For example, an avionic vehicle (such as an Unmanned Aerial Vehicle (UAV) or missile located near its destination, which may be a building or other structure, needs to know its precise three-dimensional position and orientation with respect to its destination. Current solutions use a combination of GPS and Inertial Measurement Units (IMU). However, a solution provided by GPS and IMU may not be precise enough. Recently camera images of the destination and Structure-From-Motion algorithms have been attempted to be used to get a more precise three-dimensional position and orientation. However, Structure-From-Motion algorithms are too slow for many applications that need quick determinations and hence have limited applications.

SUMMARY

The following summary is made by way of example and not by way of limitation. It is merely provided to aid the reader in understanding some of the aspects of the subject matter described. Embodiments implement an image-based-algorithm that is fast enough to compute a 3D position/rotation of the vehicle in a matter of seconds.

In one embodiment, a method of determining at least one of position and attitude in relation to an object is provided. The method includes capturing at least two images of the object with at least one camera. Each image is captured at a different position in relation to the object. The images are converted to edge images. The edge images of the object are converted into three-dimensional edge images of the object using positions of where the at least two images were captured. Overlap edge pixels in the at least two three-dimensional edge images are located to identify overlap points. A three dimensional edge candidate point image of the identified overlapped points in an evidence grid is built. The three dimensional candidate edge image in the evidence grid is compared with a model of the object to determine at least one of a then current position and attitude in relation to the object.

In another example embodiment, another method of determining vehicle position in relation to an object is provided. The method includes capturing a first two dimensional (2D) image of the object with a camera of the vehicle a first time at a first location. The first 2D image is converted into a first 2D edge image. A first set of rays are computed extending from a lens of the camera through edges in the first 2D edge image into a three dimensional (3D) evidence grid having a plurality of voxels. At least a second 2D image of the object is captured with the camera at a second time at a second location. The at least second 2D image is converted into at least a second 2D edge image. At least a second set of rays are computed extending from the lens of the camera through edges in the at least second 2D dimensional edge image into the 3D evidence grid. Candidate points within the 3D evidence grid are determined. The candidate points are voxels that contain a ray from the first set of rays and at least a ray from the at least second set of rays. Candidate points are compared with a 3D model of the object. At least a location of the vehicle in relation to the object is determined based on the comparison.

In yet another embodiment, a vehicle including at least one vehicle location determining device, at least one camera, at least one memory, and a controller is provided. The at least one memory is used to store operation instructions, a three dimensional evidence grid and a model of an object. The controller is in communication with the at least one vehicle location determining device, the at least one camera and the at least one memory. The controller is configured to cause the at least on camera to capture at least two images of the object with each image being captured at a different position in relation to the object. The controller further configured to implement the operating instructions to convert the captured images to edge images and use positions of where the at least two images were captured in converting the edge images of the object into three-dimensional edge images of the object in the three dimensional evidence grid. The controller further configured to implement the operating instruction to locate voxels within the evidence grid that indicate an overlap in space between the three-dimensional edge images. The controller further configured to implement the operating instruction to compare the voxels in the three dimensional evidence grid that indicate an overlap in space with the model of the object to determine at least one of a then current position and attitude in relation to the object.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a position location system that includes an image-based-algorithm that is fast enough to compute a three dimensional (3D) positon/attitude (rotation) of the vehicle in relation to an object in the matters of seconds. An edge-based structure-from-motion algorithm of embodiments dramatically reduces the algorithm runtime by first converting the camera images to edge images, then just doing computations based on the edge pixels, which contain the most important information. Applying the algorithm to only the edge images results in a quick process time to a solution. In an embodiment, rays are combined through each two dimensional (2D) image out into 3D space using at least one vehicle location device, such as but not limited to, GPS, IMU, vision-aided navigation system, etc. to determine position and attitude solutions. Since the vehicle location devices that are used to determine position/attitude solutions do not drift much during the short time that several images are taken, the combining of rays from edge pixels in several images provides intersections of rays in 3D inertial space at the 3D locations of object edges (such as building and structure edges). By building up candidate points (discussed in detail below) in a 3D evidence grid of such edge points, then correlating the candidate point 3D edge map with the 3D stored 3D model of the object, embodiments get the relative position/attitude of a vehicle with respect to the object in the images. In an alternative embodiment, the stored 3D edge image of the object is projected into a 2D camera frame. A 2D correlation is then performed on the stored image edges with the current photo image edges.

Figure 1:
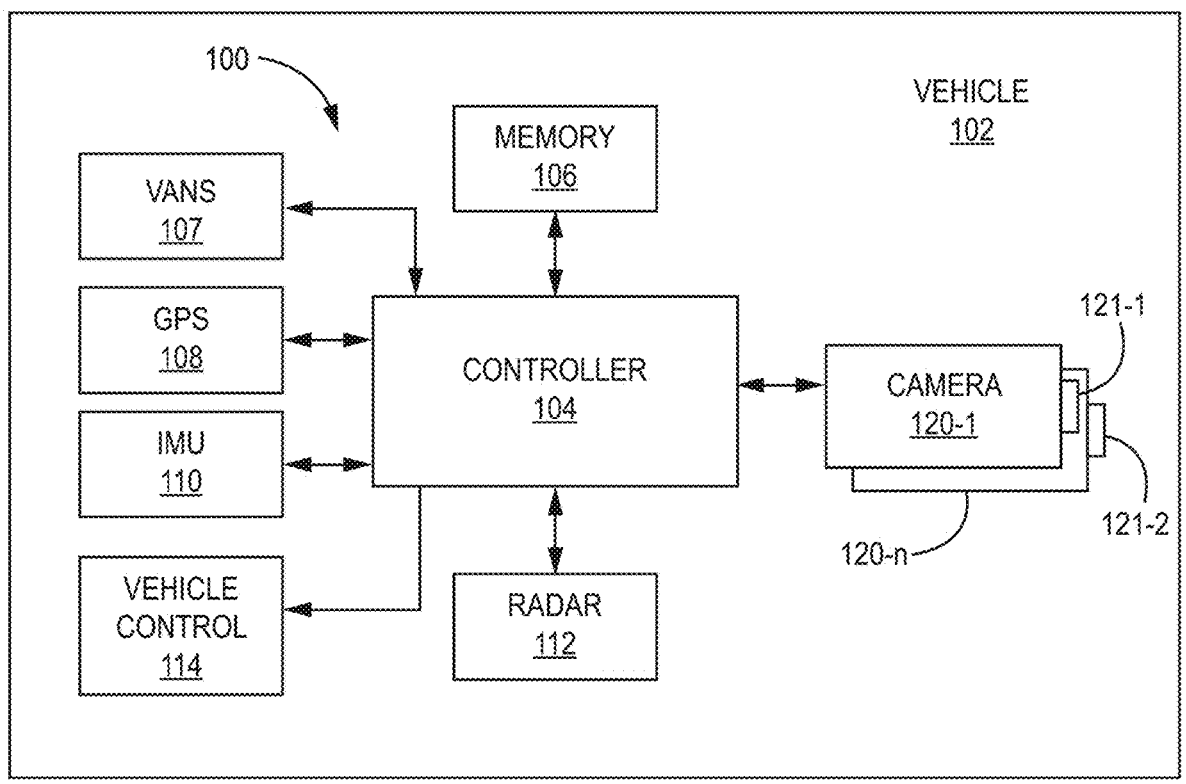
FIG. 1 is a position and attitude determination system according to one exemplary embodiment.

Referring to FIG. 1, a vehicle 102 with a position and attitude determination system 100 of an example embodiment is illustrated. As FIG. 1 illustrates, the position and attitude determination system 100 includes a controller 104 and memory 106. The example position and attitude determination system 100 further includes vehicle location determining devices such as a GPS 108, an IMU system 110 and a vision-aided navigation system 107. The position and attitude determination system 100 in this example also includes a radar 112 (which may also be used as a location determination device), a vehicle control system 114 and at least one camera 120-1 through 120-n (generally designated as 120) with lenses 121-1 through 121-n (generally designated as 121). In one embodiment, the controller 104, based on information received by at least one of the GPS 108, the IMU 110, the vision-aided navigation system 107, the radar 112 and the camera 120 controls the directional operations of the vehicle 102 via the vehicle control system 114. In embodiments, the at least one camera 120 may be a regular image camera, an inferred camera or any other type of image producing camera. Moreover, the at least one camera 120 may be two or more different types of cameras. Moreover, images from the different types of cameras may be used in embodiments since embodiments are only processing edge information which are available no matter the type of image. For example, a system may implement both a regular image camera (for use when conditions allow) and an inferred camera for when conditions deteriorate (night, smoke, dust storm, etc.) and a mix of different types of images can be used in embodiments if needed for a position/attitude solution for the vehicle 102.

In general, the controller 104 may include any one or more of a microprocessor, a digital signal processor (DSP), an application specific integrated circuit (ASIC), a field program gate array (FPGA), or equivalent discrete or integrated logic circuitry. In some example embodiments, controller 104 may include multiple components, such as any combination of one or more microprocessors, one or more controllers, one or more DSPs, one or more ASICs, one or more FPGAs, as well as other discrete or integrated logic circuitry. The functions attributed to controller 104 herein may be embodied as software, firmware, hardware or any combination thereof. Memory 106 may include computer-readable instructions that, when executed by controller 104 provide functions of the position/attitude system. Such instructions may include the functions of the edge-based structure-from-motion algorithm discussed in detail below. The computer readable instructions may be encoded within the memory 106. Memory 106 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other type of storage medium.

Figure 2:
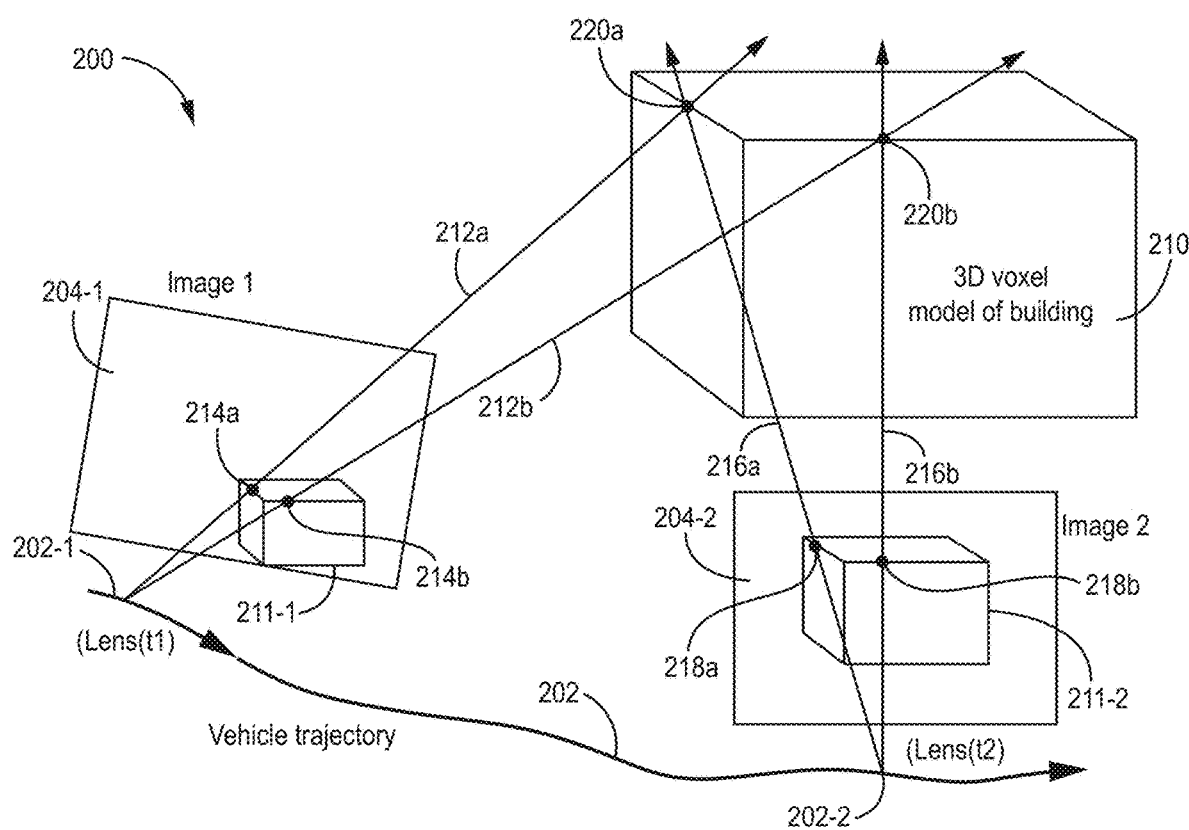
FIG. 2 is an overview illustrating how to create a three dimensional edge image with the position and attitude determination system of FIG. 1 according to one exemplary embodiment.

FIG. 2 illustrates an overview of creating a 3D edge image with the position and attitude determination system 100 of an example embodiment. In the example of FIG. 2, the location of a vehicle in relation to an object (which in this example is a building) is to be determined by at least one vehicle location determining device discussed above. The vehicle trajectory is along path 202. Along path 202 at certain times, images through a lens 121 of camera 120 are taken. In this illustration, a first image of a building (the object in this example) is taken at t1 at path location 202-1 and a second image is taken of the building at t2 at path location 202-2. The images are converted into 2D edge images 204-1 and 204-2. As illustrated, only the building edges 211-1 and 211-2 are used in the 2D edge images 204-1 and 204-2. Embodiments construct a 3D voxel map 210 of the building from the set of 2D edge images 204-1 and 204-2 at know camera locations 202-1 and 202-2. A voxel represents a value on a grid in 3D space. Rays computed to extend from a location of the lens 202-1 and 202-2 of the camera through the building edges 211-1 and 211-2 of the respective 2D edge images 204-1 and 204-2 are combined out into 3D space using GPS and IMU position and rotation information to construct the 3D voxel map 210. In the example of FIG. 2, ray 212a computed to extend from lens location 202-1 through image 204-1 at edge point 214a (which is at least one pixel in the edge image 211-1) intersects ray 216a that extends from lens location 202-2 through image 204-2 at edge point 218a at 3D voxel model intersection point 220a. In addition, ray 212b that is computed to extend from lens location 202-1 and through image 204-1 at edge point 214b intersects ray 216b that extends from lens location 202-2 and through image 204-2 at edge point 218a at 3D voxel model intersection point 220b. The voxel model intersection points 220a and 220b are used to locate edges of the building. By triangulation methods the range to the points can be determined. In use, a plurality of rays are used to develop and locate the edges in the 3D voxel model of the building 210. In an embodiment, an incremental counter at each 3D voxel along each ray form the lines through each 2D edge pixel is implemented by the controller 104. The 3D voxels with high counts occur at the intersection of rays, which are at 3D edges. Moreover, in some embodiments more than two images are used to create the 3D edge image (the 3D voxel model).

Figure 3:
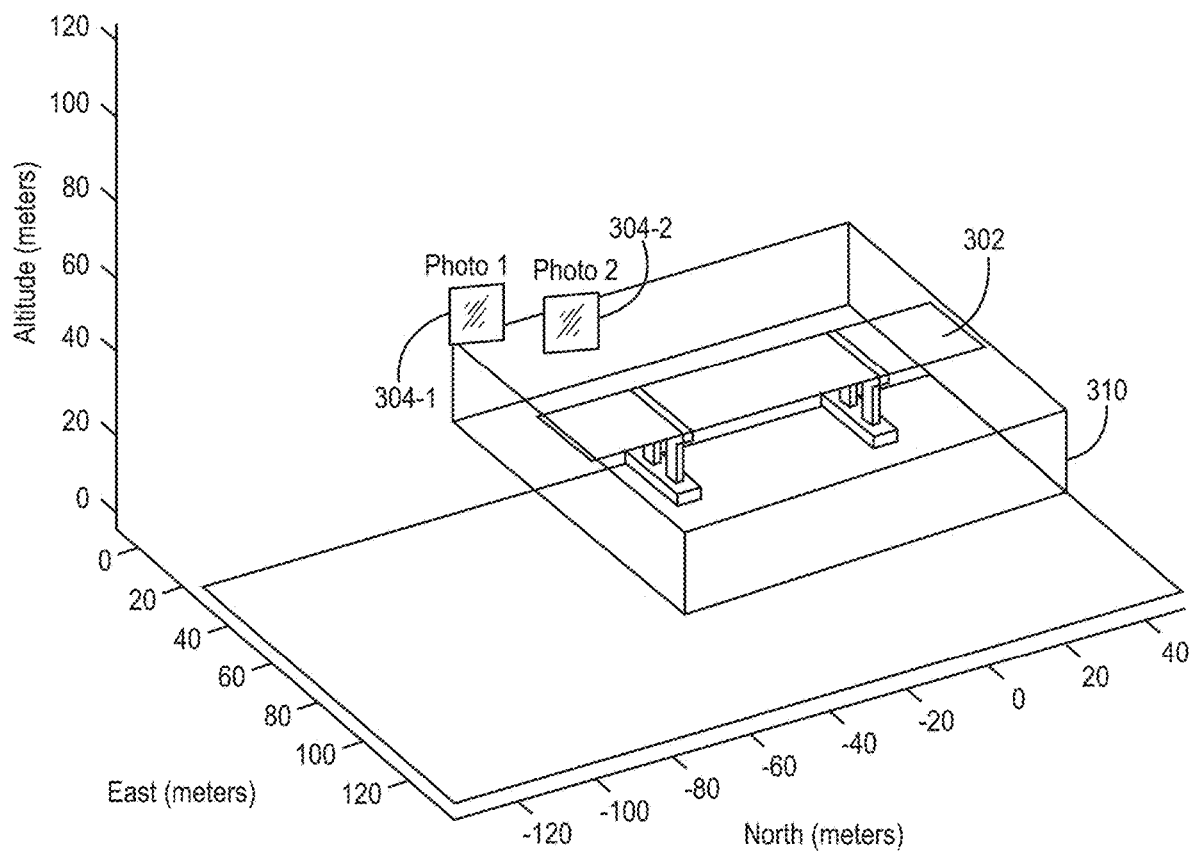
FIG. 3 illustrates a simulation that includes a CAD model of an object within an evidence grid according to one exemplary embodiment.

In embodiments, the detection of edges via intersection of rays are confirmed via 3D model of the object stored in the memory. For example, referring to FIG. 3 this is further explained. FIG. 3 illustrates a simulation that includes a CAD model of a bridge 302 that is an object a vehicle is trying to find its location/attitude in relation to. The CAD simulation of the bridge 302 is contained within an evidence grid 310 formed in memory 106. The grid 310 is represented in FIG. 3 as a wireframe 3D box. The grid 310 is divided up into a plurality of small cubes (not shown). Each cube represents a voxel. At least two images 304-1 and 304-2 are used to set information in the voxels as discussed above.

Figure 4:
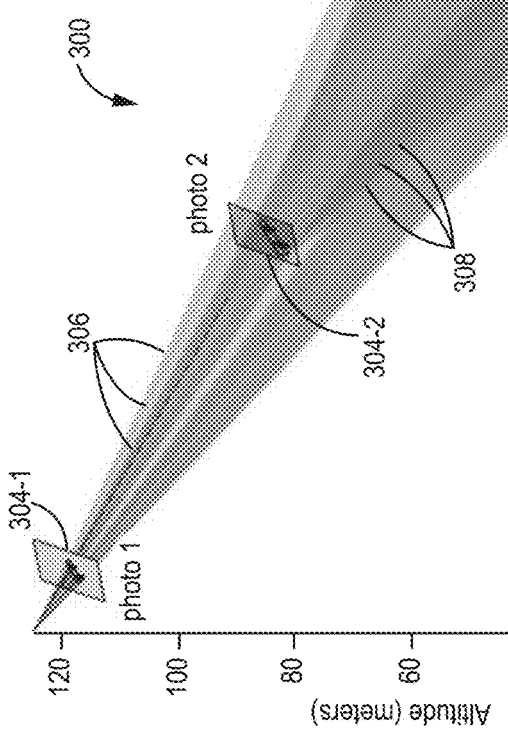
FIG. 4 illustrates a position and attitude determination system simulation according to one exemplary embodiment.

FIG. 4 illustrates a position and attitude determination system simulation 300 of an example embodiment. The position and attitude determination system simulation 300 illustrates rays 306 extending from a location of the lens 121 of the respective camera 120 a first time through edges of 2D image 304-1 of the bridge into the evidence grid 310 and rays 308 extending from a location of the lens 121 of the respective camera 120 a second time through edges of 2D image 304-2 of the bridge into the evidence grid 310. Candidate points 320 for an edge are location where the rays 306 and 308 cross in the evidence grid 310. In FIG. 4, the candidate points 320 are illustrated as crosses. A voxel associated with a candidate point 320 is assigned a select value. The candidate points are just potential points that may make up an edge of the bridge, there is no guarantee that they are in fact an edge. For example, as illustrated in FIG. 4, a lot of candidate points are false candidate points especially under the CAD drawing representation of the bridge where there are no edges.

Figure 5:
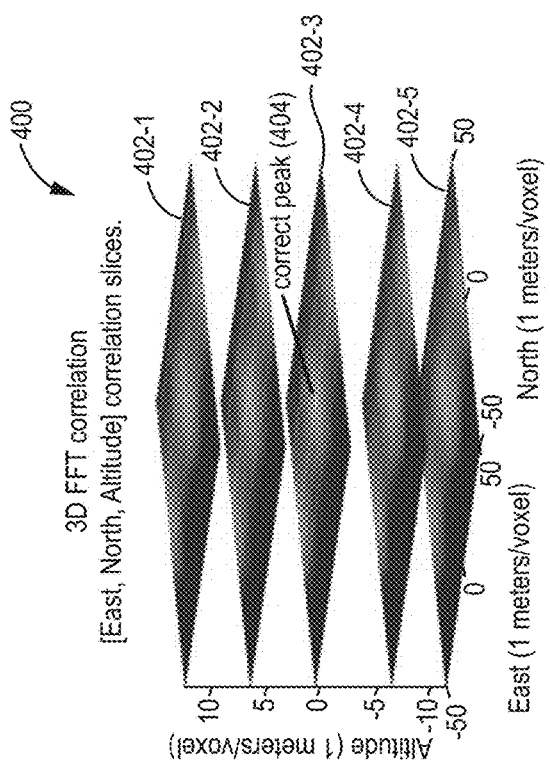
FIG. 5 is an illustration of a three dimensional FFT correlation according to one exemplary embodiment.

Even though there may be a lot of false candidate points, the location and attitude of the vehicle in relation to the bridge can still be determined by shifting around the CAD drawing of the bridge 302 to line up a best match. This comparison alignment is done in one embodiment with the use of a Fast Fourier Transform (FFT). Further in one embodiment, a 3D FFT is used and in another embodiment a 6D FFT is used. Referring to FIG. 5, a 3D FFT correlation 400 example is illustrated. The example of FIG. 5, illustrates five slices 402-1 through 402-5 through a 3D space of possible shifts in east, north and altitude. Those are the shifts of the CAD drawing in respect to the candidate points 320. The better the lineup, the lighter the shade in the slices 402-1 through 402-n. The lightest shade in one of the slices 402-1 through 4092-n represent a correct peak 404. The correct peak 404 is the shift in east, north and altitude in this example that correctly lines up the CAD drawing with the candidate points 320. The correct peak 404 is found in slice 402-3 in this example. So the FFT algorithm searches through a 3D array of values and finds the correct peak 404 that confirms the shift needed to align the vehicle up with the bridge. From this information the location/attitude of the vehicle in relation to the bridge can be determined. The peak in the 3D correlation figure is the 3D offset between the current estimated 3D position and the true 3D position. So by adding this 3D offset to the current estimate of the vehicle's position, we get an improved estimate of the vehicle's 3D position.

Since, the angles between rays associated with the two images will be different because the field of view in the images are different there is enough information to get a 3D depth perspective without having to maneuver the vehicle from side to side to take an image. This is important in a missile example of a vehicle, where it may be difficult to maneuver the vehicle to a different orientation to capture an image.

Figure 6:
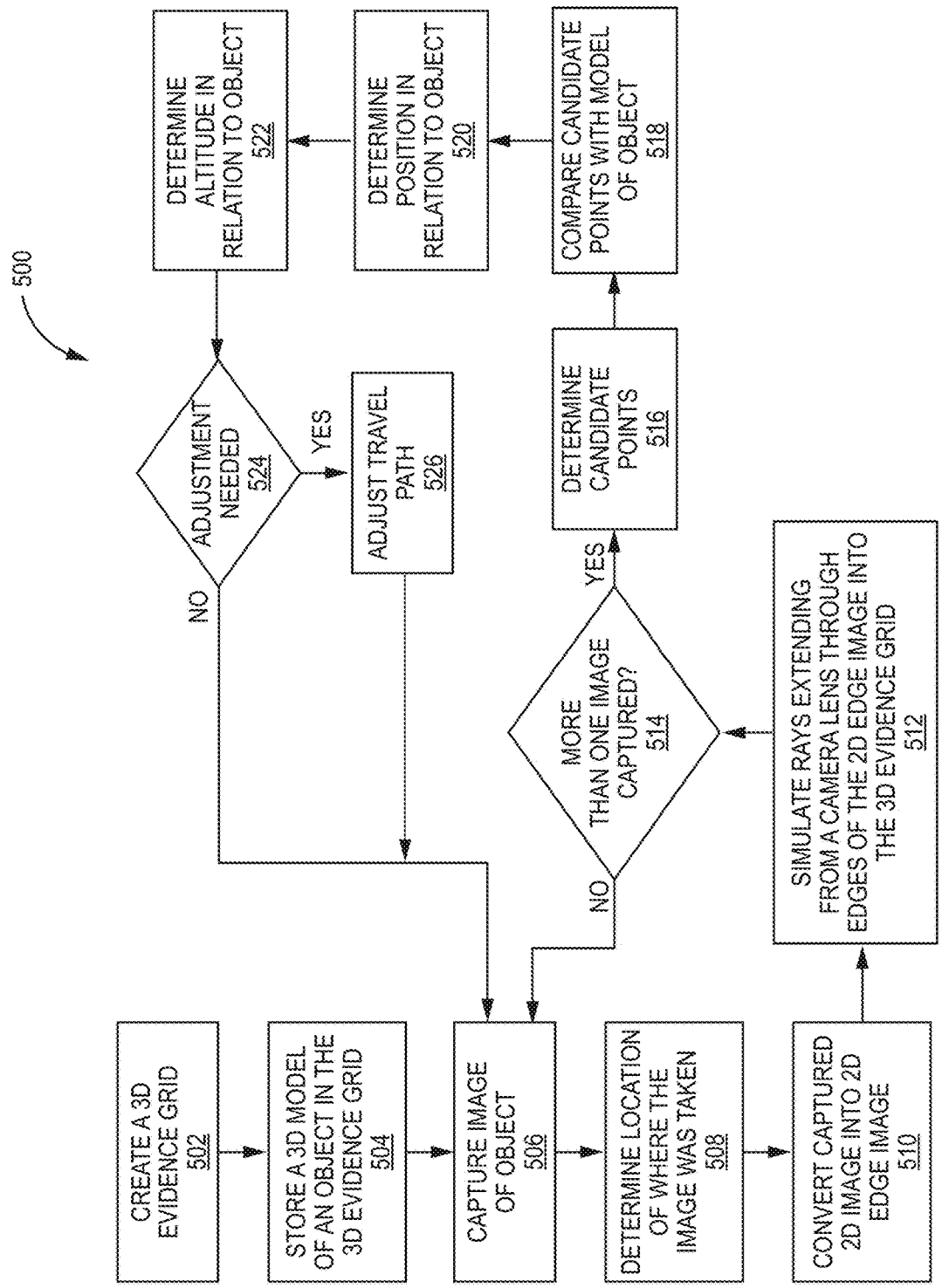
FIG. 6 illustrates a position and attitude determination in relation to an object flow diagram of one exemplary embodiment.

Referring to FIG. 6 a position and attitude determination in relation to an object flow diagram 500 of an exemplary embodiment is illustrated. The position and attitude determination in relation to an object flow diagram 500 is presented a series of blocks or steps. Although the blocks are present in a specific sequential order in this example, they may occur in a different order. Hence, embodiments are not limited to a specific order in the block occurrences. At block (502) a 3D evidence grid is created in the memory 106. The 3D evidence grid represents a 3D region of space, using many small cubes "voxels" as described above. For example, a region of space that is 100 meters east-west, 100 meters north-south and 50 meters tall may be divided up into 100*100*50 voxels of size, one meter by one meter by one meter. The 3D evidence grid stores information, for each voxel, that indicate whether or not that voxel contains part of an edge of a 3D object.

The position and attitude determination in relation to an object flow diagram 500 at block (504) stores a 3D model, such as but not limited to, a CAD model in the 3D evidence grid. At block (506) a 2D image is captured of the object by a camera 120 of the vehicle. If this is the first image captured, it will be captured at time t1. The location of the lens 121 of the camera 120 capturing the image of the object at the time that the 2D image was captured is determined at block (508). The location of where the image was captured may be provided by the GPS 108, the IMU 110 or other location determining device of the vehicle 102. The captured 2D image of the object is converted into a 2D edge image at block (510). The 2D edge image only contains edges of the object. An example of an edge detector operator to covert the 2D image into a 2D edge image is a Canny edge detector operator known in the art. Other types of edge detection operators, however, may be used.

At block (512) rays are computed that extend from the lens 121 at the determined location through edges (edge pixels) in the 2D edge image into the 3D evidence grid 310. Each voxel in the evidence grid a ray pierces has a "1" value stored in it associated the image taken at t1. In this example flow diagram 500, it is then determined at block (514) if this was the first image captured. If it was the first image captured, the process continues at block (506) capturing another 2D image at t2, converting the 2D image into a 2D edge image at block (510) and simulating associated rays at block (512). Each voxel in the evidence grid a ray pierces has a "2" value stored in it associated the image taken at t2.

If it is determined at block (514) that more than one image has been captured, the process continues at block (516) where candidate points 320 are determined. As discussed above, a candidate point 320 is a voxel that would include both a "1" value and a "2" value indicating rays calculated for both the images taken at t1 and t2 intersect at the voxel. The candidate point 320 has a high probability of being an edge of the object. The candidate points are then compared with the 3D model of the object at block 518. As discussed above, in an embodiment, a FFT (3D FFT or 6D FFT) is used to correlate the candidate points 320 with the 3D model. Based on the comparison, the position of the vehicle in relation to the object may be determined at block (520) and the attitude of vehicle in relation to the object may be determined (522).

In one example embodiment, the information gained regarding the position and attitude is used to determine if the vehicle needs to adjust its current travel path as illustrated in block (524). If no adjustment is needed, the process continues at block (506) capturing another image to process. Moreover, in this example if an adjustment in travel path is needed as is determined at block (524), an adjustment in the travel path is accomplish and then the process further continues at block (506) capturing another image to be processed. Hence, in an embodiment, the process continues to capture images at different times and process position and attitude as the vehicle travels along the path until its mission is complete.

Example Embodiments

Example 1 is a method of determining at least one of position and attitude in relation to an object. The method includes capturing at least two images of the object with at least one camera. Each image is captured at a different position in relation to the object. The images are converted to edge images. The edge images of the object are converted into three-dimensional edge images of the object using positions of where the at least two images were captured. Overlap edge pixels in the at least two three-dimensional edge images are located to identify overlap points. A three dimensional edge candidate point image of the identified overlapped points in an evidence grid is built. The three dimensional candidate edge image in the evidence grid is compared with a model of the object to determine at least one of a then current position and attitude in relation to the object.

Example 2, includes the method of Example 1, wherein the comparing of the three dimensional candidate edge image with the model of object to determine at least one of the then current position and attitude in relation to the object further comprises applying correlation techniques to determine the then current position in relation to the object.

Example 3 includes the method of Example 2, wherein applying correlation techniques include one of applying a three-dimensional Fast Fourier Transform correlation and a applying a six-dimensional Fast Fourier Transform correlation to determine both position and attitude.

Example 4 includes the method of any of the Examples 1-3, further comprising, determining the positions where the at least two images were captured by using at least one of a global positioning system, a vision-aided navigation system and an inertial measurement system.

Example 5 includes the method of any of the Examples 1-4, wherein using the positions of where the at least two images were captured in converting the edge images of the object into three-dimensional edge images of the object further comprises computing rays extending from a position of a lens of the at least one camera taking the at least two images through the edges of the respective edge images into the three dimensional evidence grid.

Example 6 includes the method of any of the Examples 1-5, further comprising, adjusting a travel path of a vehicle based on at least one of the determine at least one of then current position and attitude in relation to the object.

Example 7 includes a method of determining vehicle position in relation to an object. The method includes capturing a first two dimensional (2D) image of the object with a camera of the vehicle a first time at a first location. The first 2D image is converted into a first 2D edge image. A first set of rays are computed extending from a lens of the camera through edges in the first 2D edge image into a three dimensional (3D) evidence grid having a plurality of voxels. At least a second 2D image of the object is captured with the camera at a second time at a second location. The at least second 2D image is converted into at least a second 2D edge image. At least a second set of rays are computed extending from the lens of the camera through edges in the at least second 2D dimensional edge image into the 3D evidence grid. Candidate points within the 3D evidence grid are determined. The candidate points are voxels that contain a ray from the first set of rays and at least a ray from the at least second set of rays. Candidate points are compared with a 3D model of the object. At least a location of the vehicle in relation to the object is determined based on the comparison.

Example 8, includes the method of Example 7, further comprising, determining an attitude of the vehicle in relation to the object based on the comparison of the candidate points with the 3D model.

Example 9 includes the method of any of the Examples 7-8, further comprising, adjusting the attitude of the vehicle based on the determined attitude of the vehicle in relation to the object.

Example 10 includes the method of any of the Examples 7-9, further comprising, determining the first location and the second location of the vehicle with at least one of a global positioning system, a vision-aided navigation system and an inertial measurement system.

Example 11 includes the method of any of the Examples 7-10, wherein comparing candidate points with a 3D model of the object further comprises, applying a Fast Fourier Transform correlation.

Example 12 includes the method of Example 11, wherein the Fast Fourier Transform correlation is one of a 3D Fast Fourier Transform and a six dimensional Fast Fourier Transform.

Example 13 includes the method of any of the Examples 7-12, further comprising, storing the 3D model within the 3D evidence grid.

Example 14 includes the method of any of the Examples 7-13, further comprising, adjusting a travel path of the vehicle based on the determined location of the vehicle in relation to the object.

Example 15 is a vehicle including at least one vehicle location determining device, at least one camera, at least one memory, and a controller. The at least one memory is used to store operation instructions, a three dimensional evidence grid and a model of an object. The controller is in communication with the at least one vehicle location determining device, the at least one camera and the at least one memory. The controller is configured to cause the at least on camera to capture at least two images of the object with each image being captured at a different position in relation to the object. The controller further configured to implement the operating instructions to convert the captured images to edge images and use positions of where the at least two images were captured in converting the edge images of the object into three-dimensional edge images of the object in the three dimensional evidence grid. The controller further configured to implement the operating instruction to locate voxels within the evidence grid that indicate an overlap in space between the three-dimensional edge images. The controller further configured to implement the operating instruction to compare the voxels in the three dimensional evidence grid that indicate an overlap in space with the model of the object to determine at least one of a then current position and attitude in relation to the object.

Example 16 includes the vehicle of Example 15, further comprising, a vehicle control configured to control vehicle operations. The controller is further configured to implement the operation instructions to direct the vehicle control to control the vehicle based at least in part on the determined at least one of the then current position and attitude in relation to the object.

Example 17 includes the vehicle of any of the Examples 15-16, wherein the at least one vehicle location determining device is at least one of a global positioning system, a vision-aided navigation system and an inertial measurement system.

Example 18 includes the vehicle of any of the Examples 15-17, wherein the controller configured to implement the operating instructions to compare the voxels in the three dimensional evidence grid that indicate an overlap in space with the model of the object to determine at least one of a then current position and attitude in relation to the object further comprises, the controller applying a Fast Fourier Transform correlation.

Example 19 includes the vehicle of Examples 18, wherein the Fast Fourier Transform correlation is one of a 3D Fast Fourier Transform and a six dimensional Fast Fourier Transform.

Example 20 includes the vehicle of any of the Examples 15-19, wherein the controller is further configured to implement the operation instructions to compute rays extending from a position of a lens of the at least one camera through the edges of the respective edge images into the three dimensional evidence grid.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of determining at least one of position and attitude in relation to an object, the method comprising:
   capturing at least two images of the object with at least one camera, each image captured at a different position in relation to the object;
   converting the images to edge images;
   using positions of were the at least two images where captured in converting the edge images of the object into three-dimensional edge images of the object;
   locating overlap edge pixels in the at least two three-dimensional edge images to identify overlap points;
   building a three dimensional edge candidate point image of the identified overlapped points in an evidence grid; and
   comparing the three dimensional candidate edge image in the evidence grid with a model of the object to determine at least one of a then current position and attitude in relation to the object.

2. The method of claim 1, wherein the comparing of the three dimensional candidate edge image with the model of object to determine at least one of the then current position and attitude in relation to the object further comprises:
   applying correlation techniques to determine the then current position in relation to the object.

3. The method of claim 2, wherein applying correlation techniques include one of applying a three-dimensional Fast Fourier Transform correlation and a applying a six-dimensional Fast Fourier Transform correlation to determine both position and attitude.

4. The method of claim 1, further comprising:
   determining the positions were the at least two images where captured by using at least one of a global positioning system, a vision-aided navigation system and an inertial measurement system.

5. The method of claim 1, wherein using the positions of were the at least two images where captured in converting the edge images of the object into three-dimensional edge images of the object further comprises:
   computing rays extending from a position of a lens of the at least one camera taking the at least two images through the edges of the respective edge images into the three dimensional evidence grid.

6. The method of claim 1, further comprising:
   adjusting a travel path of a vehicle based on at least one of the determine at least one of then current position and attitude in relation to the object.

7. A method of determining vehicle position in relation to an object, the method comprising:
   capturing a first two dimensional (2D) image of the object with a camera of the vehicle a first time at a first location;
   converting the first 2D image into a first 2D edge image
   computing a first set of rays extending from a lens of the camera through edges in the first 2D edge image into a three dimensional (3D) evidence grid having a plurality of voxels;
   capturing at least a second 2D image of the object with the camera at a second time at a second location;
   converting the at least second 2D image into at least a second 2D edge image;
   computing at least a second set of rays extending from the lens of the camera through edges in the at least second 2D dimensional edge image into the 3D evidence grid;
   determining candidate points within the 3D evidence grid, the candidate points being voxels that contain a ray from the first set of rays and at least a ray from the at least second set of rays;
   comparing candidate points with a 3D model of the object; and
   determining at least a location of the vehicle in relation to the object based on the comparison.

8. The method of claim 7, further comprising:
   determining an attitude of the vehicle in relation to the object based on the comparison of the candidate points with the 3D model.

9. The method of claim 8, further comprising:
   adjusting the attitude of the vehicle based on the determined attitude of the vehicle in relation to the object.

10. The method of claim 7, further comprising:
    determining the first location and the second location of the vehicle with at least one of a global positioning system, a vision-aided navigation system and an inertial measurement system.

11. The method of claim 7, wherein comparing candidate points with a 3D model of the object further comprises:
    applying a Fast Fourier Transform correlation.

12. The method of claim 11, wherein the Fast Fourier Transform correlation is one of a 3D Fast Fourier Transform and a six dimensional Fast Fourier Transform.

13. The method of claim 7, further comprising:
    storing the 3D model within the 3D evidence grid.

14. The method of claim 7, further comprising:
    adjusting a travel path of the vehicle based on the determined location of the vehicle in relation to the object.

15. A vehicle comprising:
    at least one vehicle location determining device;
    at least one camera;
    at least one memory to store operation instructions, a three dimensional evidence grid and a model of an object; and
    a controller in communication with the at least one vehicle location determining device, the at least one camera and the at least one memory, the controller configured to cause the at least on camera to capture at least two images of the object with each image being captured at a different position in relation to the object, the controller further configured to implement the operating instructions to convert the captured images to edge images and use positions of where the at least two images were captured in converting the edge images of the object into three-dimensional edge images of the object in the three dimensional evidence grid, the controller further configured to implement the operating instruction to locate voxels within the evidence grid that indicate an overlap in space between the three-dimensional edge images, the controller further configured to implement the operating instruction to compare the voxels in the three dimensional evidence grid that indicate an overlap in space with the model of the object to determine at least one of a then current position and attitude in relation to the object.

16. The vehicle of claim 15, further comprising:
a vehicle control configured to control vehicle operations, the controller further configured to implement the operation instructions to direct the vehicle control to control the vehicle based at least in part on the determined at least one of the then current position and attitude in relation to the object.

17. The vehicle of claim 15, wherein the at least one vehicle location determining device is at least one of a global positioning system, a vision-aided navigation system and an inertial measurement system.

18. The vehicle of claim 15, wherein the controller configured to implement the operating instruction to compare the voxels in the three dimensional evidence grid that indicate an overlap in space with the model of the object to determine at least one of a then current position and attitude in relation to the object further comprises:
the controller applying a Fast Fourier Transform correlation.

19. The vehicle of claim 18, wherein the Fast Fourier Transform correlation is one of a 3D Fast Fourier Transform and a six dimensional Fast Fourier Transform.

20. The vehicle of claim 15, wherein the controller is further configured to implement the operation instructions to compute rays extending from a position of a lens of the at least one camera through the edges of the respective edge images into the three dimensional evidence grid.

* * * * *

UNITED STATES PATENT AND TRADEMARK OFFICE
CERTIFICATE OF CORRECTION

PATENT NO. : 10,607,364 B2
APPLICATION NO. : 15/799444
DATED : March 31, 2020
INVENTOR(S) : Michael Ray Elgersma and Benjamin Mohr It is certified that error appears in the above-identified patent and that said Letters Patent is hereby corrected as shown below:

At Column 9, Claim 1, Line 38 and 39, please replace "positions of were the at least two images where captured" with --positions of where the at least two images were captured--

At Column 9, Claim 4, Lines 62 and 63, please replace "positions were the at least two images where captured" with --positions where the at least two images were captured--

At Column 9, Claim 5, Lines 66 and 67, please replace "positions of were the at least two images where captured" with --positions of where the at least two images were captured--

At Column 10, Claim 6, Lines 8 and 9, please replace "based on at least one of the determine at least one of then current" with --based on at least one of the then current--

At Column 10, Claim 15, Lines 62 and 63, please replace "a three dimensional evidence" with --a three-dimensional evidence--

Signed and Sealed this
First Day of December, 2020

Andrei Iancu
*Director of the United States Patent and Trademark Office*